United States Patent
Kwon et al.

(10) Patent No.: US 12,163,088 B2
(45) Date of Patent: Dec. 10, 2024

(54) HOLLOW PARTICLES, METHOD OF MANUFACTURING THE SAME, THE HEAT-DISSIPATING FLUID COMPOSITION INCLUDING THE SAME

(71) Applicant: LG CHEM, LTD., Seoul (KR)

(72) Inventors: Kyung An Kwon, Daejeon (KR); Moon Seok Chun, Daejeon (KR); Do Yun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 597 days.

(21) Appl. No.: 17/623,869

(22) PCT Filed: Jan. 26, 2021

(86) PCT No.: PCT/KR2021/001025
§ 371 (c)(1),
(2) Date: Dec. 29, 2021

(87) PCT Pub. No.: WO2021/153972
PCT Pub. Date: Aug. 5, 2021

(65) Prior Publication Data
US 2022/0356388 A1 Nov. 10, 2022

(30) Foreign Application Priority Data

Jan. 30, 2020 (KR) .................. 10-2020-0010963

(51) Int. Cl.
*C09K 5/10* (2006.01)
*C01B 32/168* (2017.01)
(Continued)

(52) U.S. Cl.
CPC .............. *C09K 5/10* (2013.01); *C01B 32/168* (2017.08); *C01B 32/194* (2017.08);
(Continued)

(58) Field of Classification Search
CPC .......... C09K 5/10; C09K 5/08; C01B 32/168; C01B 32/194; C01B 2202/24;
(Continued)

(56) References Cited

U.S. PATENT DOCUMENTS

2014/0356726 A1 12/2014 Han et al.
2015/0291764 A1* 10/2015 Yuan .................... C09K 3/1436
524/417

(Continued)

FOREIGN PATENT DOCUMENTS

CN 106433903 A 2/2017
CN 107500591 A 12/2017
(Continued)

*Primary Examiner* — Andrew J. Oyer
(74) *Attorney, Agent, or Firm* — BRYAN CAVE LEIGHTON PAISNER LLP

(57) ABSTRACT

Hollow spherical particles which include: an inorganic particle layer including ceramic particles and conductive carbon-based particles; and a polymer coating layer surrounding the inorganic particle layer, and in which the inorganic particle layer surrounds an empty inner space to form the hollow spherical particles. A method of manufacturing the hollow spherical particles and a heat-dissipating fluid composition including the hollow spherical particles.

15 Claims, 2 Drawing Sheets

(51) Int. Cl.
*C01B 32/194* (2017.01)
*H01M 10/615* (2014.01)
*H01M 10/6567* (2014.01)

(52) U.S. Cl.
CPC ..... *H01M 10/615* (2015.04); *H01M 10/6567* (2015.04); *C01B 2202/24* (2013.01); *C01B 2204/24* (2013.01); *C01P 2004/34* (2013.01); *C01P 2004/61* (2013.01); *C01P 2004/62* (2013.01); *C01P 2004/80* (2013.01)

(58) Field of Classification Search
CPC ............ C01B 2204/24; H01M 10/615; H01M 10/6567; H01M 10/613; H01M 50/211; H01M 10/653; H01M 10/656; H01M 50/22; H01M 50/20; H01M 50/24; C01P 2004/34; C01P 2004/61; C01P 2004/62; C01P 2004/80; B01J 13/20; B01J 13/02; B01J 13/22; C04B 35/117; C04B 2111/00853; C04B 2235/3217; C04B 2235/3418; C04B 2235/422; C04B 2235/528; C04B 2235/5288; C04B 2235/5436; C04B 2235/5445; C04B 2235/6567; C04B 2235/6583; C04B 35/10; C04B 35/14; C04B 35/18; C04B 38/009; C08K 3/041; C08K 3/042; C08K 3/36; C08K 2003/2227; C08K 7/24; C08K 7/26; C08K 9/10; C08K 3/013; C08K 3/04; Y02E 60/10; C08J 3/20
See application file for complete search history.

(56) References Cited

U.S. PATENT DOCUMENTS

| | | |
|---|---|---|
| 2017/0279124 A1 | 9/2017 | Kim et al. |
| 2020/0020998 A1 | 1/2020 | Kwon et al. |
| 2020/0031671 A1* | 1/2020 | Zhamu ................ C01B 32/20 |

FOREIGN PATENT DOCUMENTS

| | | |
|---|---|---|
| EP | 2835350 A1 | 2/2015 |
| JP | 2014-041169 A | 3/2014 |
| KR | 10-0795309 B1 | 1/2008 |
| KR | 10-1092327 B1 | 12/2011 |
| KR | 20130041554 A | 4/2013 |
| KR | 10-1274975 B1 | 6/2013 |
| KR | 10-2015-0107923 A | 9/2015 |
| KR | 10-1551366 B1 | 9/2015 |
| KR | 10-1560931 B1 | 10/2015 |
| KR | 10-2016-0022156 A | 2/2016 |
| KR | 10-2018-0050185 A | 5/2018 |
| KR | 10-1875960 B1 | 7/2018 |
| KR | 10-2019-0064209 A | 6/2019 |
| KR | 10-2030899 B1 | 10/2019 |

* cited by examiner

[FIG. 1]
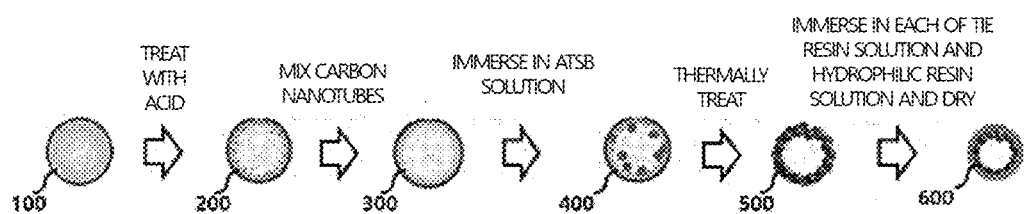
[FIG. 2]
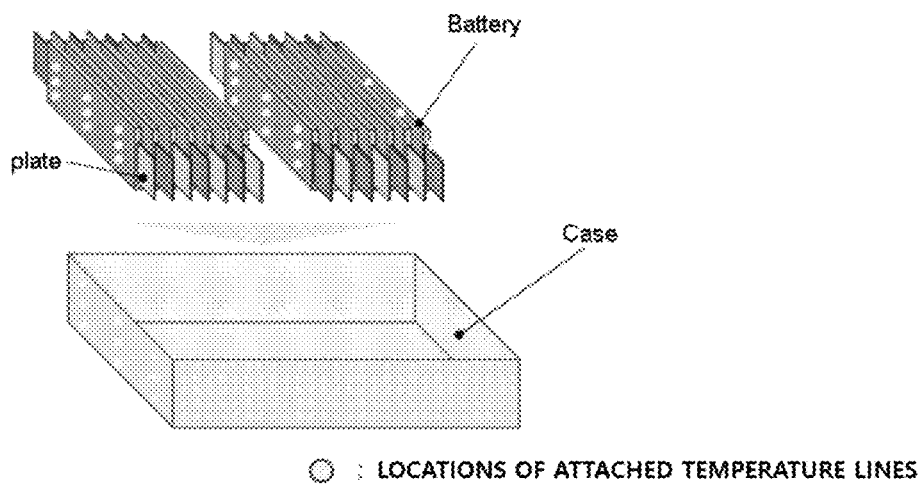
○ : LOCATIONS OF ATTACHED TEMPERATURE LINES

[FIG. 3]
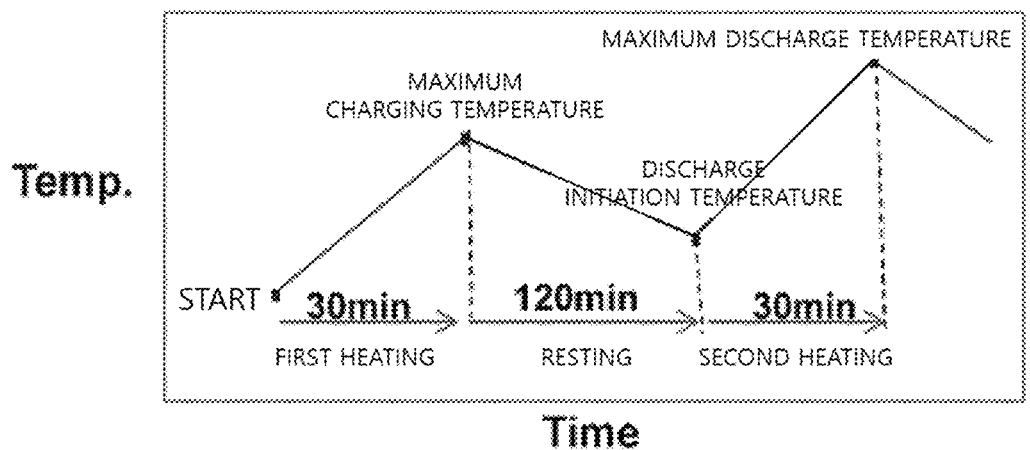

HOLLOW PARTICLES, METHOD OF MANUFACTURING THE SAME, THE HEAT-DISSIPATING FLUID COMPOSITION INCLUDING THE SAME

CROSS-REFERENCE TO RELATED APPLICATIONS

This application is a U.S. national stage of international application No. PCT/KR2021/001025, filed on Jan. 26, 2021, which claims priority to and the benefit of Korean Patent Application No. 10-2020-0010963, filed on Jan. 30, 2020, the disclosure of which are incorporated herein by reference in their entirety.

TECHNICAL FIELD

The present invention relates to hollow particles capable of improving the heat dissipation performance of a heat-dissipating fluid, a method of manufacturing the same, and a heat-dissipating fluid composition including the same.

BACKGROUND

Secondary batteries are considered to be the core technology of smart grids capable of storing, charging, and discharging a large amount of electricity by including various types of batteries connected in series and/or in parallel. Research to further increase the electrical capacity of batteries has been actively conducted in various institutions, and batteries having increased electrical capacity increase the driving range of electric vehicles and enable the use of stored electric energy in homes and industries thereby improving quality of life.

However, as the power density inside battery modules is increased to increase the electrical capacity of secondary batteries, heat-related issues caused by charging and discharging a large amount of energy at high speed have emerged. Failure to control the heat inside a battery module leads to a rapid decrease in battery lifespan and a risk of explosion and fire. Therefore, excellent heat dissipation characteristics that allow heat inside the battery module to be quickly discharged to the outside are required. Although such a requirement can be satisfied by an air-cooling method in which heat is controlled by driving a fan and allowing air in the atmosphere to be passed across the battery and discharged to the outside of the battery module, the air-cooling method has disadvantages such as a maximized module volume due to the inclusion of a fan, noise generation, increased costs, and power loss due to the need to drive a fan.

Accordingly, to replace the air-cooling method, efforts have been made to improve heat dissipation characteristics by impregnating a battery with a heat-dissipating fluid instead of installing a fan inside a module including the battery.

However, when materials such as water or ethylene glycol are used as the heat-dissipating fluid, there may be a risk of battery explosion or the like because such a fluid has high electrical conductivity. Therefore, the use of oil-based fluids exhibiting high electrical insulation is contemplated, and until now, conventional engine oils, gear oils, silicone oils, mineral oils, and the like are known as heat transfer oils. However, these fluids have an insufficient heat dissipation capability for dissipating heat generated by the repeated high-speed charging and discharging of a battery to a satisfactory level.

Accordingly, efforts have been made to add thermally conductive inorganic particles to a heat-dissipating fluid to further increase heat dissipation characteristics, but after prolonged use, the inorganic particles settle due to the weight of the inorganic particles, causing the heat dissipation characteristics to be significantly degraded. In addition, carbon-based inorganic particles such as graphite particles, carbon nanotubes, and graphene particles, which have high heat dissipation performance, also have high electrical conductivity and thus cannot be used as inorganic particles for mixing with a heat-dissipating fluid. Although only inorganic particles such as silica and alumina particles, which are advantageous in terms of electrical conductivity but have low heat dissipation performance, have been used as inorganic particles for mixing with a heat-dissipating fluid, the silica and alumina particles have somewhat poor heat dissipation properties.

Accordingly, there is a need for inorganic particles that can improve heat dissipation performance by mixing with a heat-dissipating fluid.

SUMMARY

The present invention is directed to providing hollow particles having excellent heat dissipation performance, a method of manufacturing the same, and a heat-dissipating fluid composition including the same.

One exemplary aspect of the present invention provides hollow spherical particles, which include: an inorganic particle layer including ceramic particles and conductive carbon-based particles; and a polymer coating layer surrounding the inorganic particle layer, and in which the inorganic particle layer surrounds an empty inner space of the hollow spherical particles.

Another exemplary aspect of the present invention provides a method of manufacturing hollow particles invention, the method including: (A) treating spherical particles formed of a thermoplastic polymer with an acid and adding conductive carbon-based particles; (B) immersing the particles of step (A) in a ceramic precursor solution, thereby introducing ceramic precursor ions; (C) thermally treating the particles of step (B), thereby forming an inorganic particle layer including the ceramic particles and the conductive carbon-based particles on the surface of the particles and, at the same time, where the inorganic particle layer surrounds an empty inner space; and (D) immersing the particles of step (C) in a hydrophilic resin solution, thereby forming a polymer coating layer on the outside of the inorganic particle layer.

Still another exemplary aspect of the present invention provides a heat-dissipating fluid composition, which includes: a non-conductive oil; a thermally conductive fluid; and hollow particles according to an exemplary embodiment of the present invention.

According to the present invention, it is possible to provide hollow particles which contain a carbon-based inorganic material that cannot be mixed with a heat-dissipating fluid due to having high electrical conductivity and have excellent heat dissipation performance.

In addition, it is possible to provide a method of manufacturing the hollow particles with a simple process.

In addition, it is possible to provide a heat-dissipating fluid composition which has improved heat dissipation performance due to inclusion of the hollow particles.

BRIEF DESCRIPTION OF DRAWINGS

FIG. 1 is a schematic illustration of a method of manufacturing hollow particles according to an exemplary embodiment of the present invention.

FIG. 2 is an exploded perspective view of a battery module including a module case and a battery according to one exemplary embodiment of the present invention.

FIG. 3 is a graphical representation of a temperature change of a battery during charging and discharging according to one exemplary embodiment of the present invention.

DETAILED DESCRIPTION

Hereinafter, the present invention will be described in more detail to aid in understanding the present invention. Here, terms or words used in the present specification and the claims should not be construed as being limited to a conventional or dictionary meaning, and, based on the principle that the inventor can properly define the concept of terms in order to describe his or her invention in the best way, the terms or words should be interpreted with meanings and concepts consistent with the technical idea of the present invention.

In the present specification, terms such as "contain," "include," or "have" are intended to indicate the presence of implemented features, numbers, steps, components, or a combination thereof, and should be understood as not precluding the possibility of the addition or presence of one or more other features, numbers, steps, components, or combinations thereof.

In addition, in the present specification, when it is stated that one layer or element is formed "on" or "above" another layer or element, it means that the first layer or element is directly formed on the second layer or element, or that a third layer or element may be additionally formed between the above-described layers, on an object, or on a substrate.

Hollow Particles

Hollow particles of the present invention are hollow spherical particles, which include: an inorganic particle layer including ceramic particles and conductive carbon-based particles; and a polymer coating layer surrounding the inorganic particle layer, and in which the inorganic particle layer surrounds an empty inner space of the hollow spherical particles.

Since the hollow particles of the present invention include both ceramic particles, which are advantageous in terms of electrical conductivity, and conductive carbon-based particles, which cannot be mixed with a heat-dissipating fluid because of high electrical conductivity, and also include a polymer coating layer, for example, a polymer coating layer having a relative permittivity of 45 or less, hollow particles having excellent heat dissipation performance can be provided. The polymer coating layer blocks the conduction of electrically charged particles to the heat-dissipating fluid by the conductive carbon-based particles, and is, thus, capable of reducing the occurrence of electrical problems inside a battery.

According to an exemplary embodiment of the present invention, the ceramic particles may include one or more selected from silica, alumina, and aluminosilicate.

According to an exemplary embodiment of the present invention, the conductive carbon-based particles may include one or more selected from graphite, graphene, and carbon nanotubes.

The inorganic particle layer including the ceramic particles and the conductive carbon-based particles may include one or more selected from silica, alumina, and aluminosilicate and one or more selected from graphite, graphene, and carbon nanotubes. For example, the inorganic particle layer may include alumina and carbon nanotubes, or may include silica and graphene.

Meanwhile, the silica may be any silica except for fumed silica, and the alumina may be any alumina except for fumed alumina. Fumed silica and fumed alumina have a large number of empty pores therein and, thus, do not have high thermal conductivity, and due to the small size of the pores, there may be a problem where a heat-dissipating fluid cannot penetrate into a large number of internal pores.

According to an exemplary embodiment of the present invention, a weight ratio of the ceramic particles and the conductive carbon-based particles may be in the range of 5:1 to 3:1, 5:1 to 4:1, or 4:1 to 3:1. When the weight ratio of the ceramic particles and the conductive carbon-based particles is within the above ranges, electrical conductivity and heat dissipation performance may be improved.

According to an exemplary embodiment of the present invention, the polymer coating layer may include a polymer having a relative permittivity of 45 or less. In this case, problems in a battery due to the high electrical conductivity of the conductive carbon-based particles can be prevented because of the polymer coating layer. For example, an electrical short circuit phenomenon that may occur in a battery can be prevented.

Meanwhile, the polymer coating layer may include a tie resin layer and a resin layer having a relative permittivity of 45 or less. That is, the polymer coating layer may include two layers. The tie resin layer may be a layer configured to improve bonding strength between the hollow inorganic particles and the coating layer, and the resin layer having a relative permittivity of 45 or less may be a layer configured to prevent an electrical short circuit phenomenon.

According to an exemplary embodiment of the present invention, the polymer coating layer may have a thickness of 0.3 μm to 2 μm, 0.2 μm to 1.5 μm, or 0.1 μm to 1 μm. When the thickness of the polymer coating layer is within the above ranges, heat dissipation performance is excellent, and electrical problems that may occur inside the battery due to the conductive carbon-based particles can be prevented.

According to an exemplary embodiment of the present invention, the hollow particles may have an average particle diameter ($D_{50}$) of 0.5 μm to 5 μm, 0.6 μm to 4 μm, or 0.7 μm to 3 μm. When the average particle diameter of the hollow particles is within the above ranges, agglomeration between particles due to a Van der Waals force is relatively less severe, that is, the particles are well dispersed, which may be preferable to improve heat dissipation characteristics.

According to an exemplary embodiment of the present invention, the hollow particles may have a hollow diameter of 0.1 μm to 2 μm or 0.2 μm to 1.5 μm. When the hollow diameter of the hollow particles is within the above ranges, the heat dissipation properties may improve because, when manufacturing a heat-dissipating fluid using a ball mill, the particles do not collapse and can maintain the hollow state.

In the present specification, the average particle diameter ($D_{50}$) and the hollow diameter of the hollow particles can be measured using a scanning electron microscope (SEM). Specifically, 20 particles are selected using an SEM, and the particle diameter and hollow diameter of each of these particles are measured using an icon bar that can be used for diameter measurement, followed by calculation of the respective arithmetic mean thereof.

Hollow Particle Manufacturing Method

A method of manufacturing hollow particles according to an exemplary embodiment of the present invention includes: (A) treating spherical particles formed of a thermoplastic polymer with an acid and adding conductive carbon-based particles; (B) immersing the particles of step (A) in a ceramic precursor solution, thereby introducing ceramic precursor ions; (C) thermally treating the particles of step (B), thereby forming an inorganic particle layer including the ceramic particles and the conductive carbon-based particles on the surface of the particles and, where the inorganic particle layer surrounds an empty inner space of the hollow spherical particles; and (D) immersing the particles of step (C) in a hydrophilic resin solution, thereby forming a polymer coating layer on the outside of the inorganic particle layer.

Hereinafter, each of the steps will be described in more detail.

In step (A), spherical particles formed of a thermoplastic polymer are treated with an acid, and conductive carbon-based particles are added. In step (A), the surface of the spherical particles formed of thermoplastic polymer is carbonized.

Since the method of the present invention includes the step (A), conductive carbon-based particles that are not easily bonded with a thermoplastic polymer can be easily formed in the thermoplastic polymer, and a polymer form that can be impregnated with a ceramic particle precursor solution in a subsequent process of introducing ceramic particles such as silica, alumina, and aluminosilicate particles can be obtained.

Specifically, in step (A), the spherical particles formed of a thermoplastic polymer may be treated with an acid to modify the surface of the particles with anions, and then conductive carbon-based particles, for example, one or more selected from graphite, graphene, and carbon nanotubes, may be added to form spherical particles of a thermoplastic polymer and having a carbon-treated surface.

FIG. 1 is a schematic illustration of a method of manufacturing hollow particles according to an exemplary embodiment of the present invention.

As illustrated in FIG. 1, spherical particles 300 formed of a thermoplastic polymer and having a carbon-treated surface may be manufactured by treating spherical particles 100 formed of a thermoplastic polymer with an acid to modify the surface of the particles with anions and then adding conductive carbon-based particles.

The acid treatment may be carried out at a pH of 2 to 5, and in this case, it is possible to modify the interior, as well as the surface, of the particles due to a diffusion effect while not damaging the thermoplastic polymer. In this case, the degree to which the anions are introduced into the interior may be adjusted by controlling a stirring time and a stirring speed.

According to an exemplary embodiment of the present invention, the thermoplastic polymer may be one or more selected from among styrene, poly(styrene-co-divinylbenzene), and polyphenylene ether. When the above material is used as the thermoplastic polymer, it is possible to selectively remove only the thermoplastic polymer during heat treatment in step (C) without affecting the hollow inorganic particles.

In step (B), the particles of step (A) are immersed in a ceramic precursor solution, thereby introducing ceramic precursor ions to the particles of step (A). That is, the spherical particles formed of a thermoplastic polymer and having a carbon-treated surface are immersed in a ceramic precursor solution, for example, a solution containing one or more selected from among tetrachlorosilane and aluminum-tri-sec-butoxide (ATSB), thereby introducing ceramic precursor ions to the hollow particles. The ceramic precursor solution may be a solution containing tetrachlorosilane, a solution containing ATSB, or a solution containing tetrachlorosilane and ATSB in a weight ratio of 1:1.

Since the method of the present invention includes the step (B), hollow inorganic particles including both ceramic particles and conductive carbon-based particles can be easily manufactured.

As illustrated in FIG. 1, when the spherical particles 300 formed of a thermoplastic polymer and having a carbon-treated surface are immersed in an ATSB solution, alumina precursor ions, for example, $Al^{3+}$ ions, can be introduced to the spherical particles 300.

In step (C), the particles of step (B) are thermally treated to form an inorganic particle layer including the ceramic particles and the conductive carbon-based particles on the surface of the particles, where the inorganic particle layer surrounds an empty inner space of the hollow spherical particles. Specifically, in step (C), hollow inorganic particles in which an inorganic particle layer including ceramic particles and conductive carbon-based particles formed on the surface of the particles are manufactured.

In the present invention, since simple heat treatment is carried out in step (C), causing ceramic precursor ions to react with oxygen, one or more selected from among silica, alumina, and aluminosilicate can be produced. For example, as illustrated in FIG. 1, hollow inorganic particles 500, in which an inorganic particle layer including alumina and carbon nanotubes is formed, can be easily prepared.

According to an exemplary embodiment of the present invention, the heat treatment of step (C) may be performed at a temperature of 500° C. to 1,000° C., 550° C. to 950° C., or 600° C. to 900° C. When the heat treatment temperature of step (C) is within the above ranges, only the thermoplastic polymer can be selectively removed without affecting the hollow inorganic particles. The heat treatment of step (C) may be carried out for one to three hours so that only the thermoplastic polymer is selectively removed.

According to an exemplary embodiment of the present invention, the heat treatment of step (C) may be performed under oxygen conditions. In this case, a hollow structure can be formed by converting the styrene polymer into carbon dioxide to remove the same, and because ceramic precursor ions on the surface are bonded with oxygen to produce silica or alumina, hollow inorganic particles, in which the inorganic particle layer surrounds an empty inner space can be obtained.

In step (D), the particles of step (C) are immersed in a hydrophilic resin solution to form a polymer coating layer on the outside of the inorganic particle layer.

According to an exemplary embodiment of the present invention, step (D) may additionally include a step of immersing the particles of step (C) in a tie resin solution before immersing the same in a hydrophilic resin solution. Specifically, in step (D), the hollow inorganic particles may be immersed in a tie resin solution, dried, and then immersed in a hydrophilic resin solution, and dried again, to form a polymer coating layer.

As illustrated in FIG. 1, when the hollow inorganic particles are immersed in a tie resin solution, dried, and then immersed in a hydrophilic resin solution, and dried again in step (D), hollow particles 600, in which a polymer coating layer is formed on the hollow inorganic particles, may be obtained.

According to an exemplary embodiment of the present invention, the tie resin may be one or more selected from an ethylene-vinyl acetate resin, an ethylene-methyl acrylate resin, an ethylene-acrylic acid resin, and a cyano resin. In this case, the coating layer can be firmly attached to the hollow inorganic particles because adhesion between the hollow inorganic particles and the coating layer is improved. That is, the durability of the hollow particles can be increased.

According to an exemplary embodiment of the present invention, the coating resin may be a resin with a relative permittivity of 45 or less. For example, the coating resin may be polyvinyl alcohol, polyethylene vinyl alcohol, and the like. In this case, an electrical problem that may occur in a battery due to the electrical conductivity of the conductive carbon-based particles can be prevented.

Heat Dissipating Fluid Composition

A heat-dissipating fluid composition of the present invention includes: a non-conductive oil; a thermally conductive fluid, specifically, a fluid having a relative permittivity of 40 or less; and hollow particles according to an exemplary embodiment of the present invention.

According to an exemplary embodiment of the present invention, the heat-dissipating fluid composition may include the thermally conductive fluid at 5 to 200 parts by weight and the hollow particles at 5 to 40 parts by weight based on 100 parts by weight of the non-conductive oil.

The non-conductive oil and the thermally conductive fluid may form separate phases.

Inorganic particles have been used to improve heat dissipation properties in the heat-dissipating fluid compositions used in conventional battery-cooling methods, but these inorganic particles settle in the compositions over time and, thus, do not contribute to the improvement of heat dissipation properties.

To solve the above problem, a heat-dissipating fluid composition of the present invention includes two types of liquids that are immiscible and thus form separate phases, a non-conductive oil, and a thermally conductive fluid. In this specification, "the non-conductive oil and the thermally conductive fluid form separate phases" means that the two liquids do not mix with each other and are present as two separate layers, and this can be confirmed by the fact that when these two liquids are mixed, 90% or more, or 95% to 100%, of the two liquids are separated into individual layers after a certain period of time, for example, about five minutes.

Preferably, the thermally conductive fluid is present in an upper layer of the heat-dissipating fluid composition, and the non-conductive oil is present in a lower layer. Since the hollow particles present in the phase-separated composition do not settle even after a long period of time has passed, regardless of the viscosity of a fluid used, the hollow particles can contribute to the improvement of heat dissipation properties. Accordingly, the heat-dissipating fluid composition can maintain excellent heat dissipation properties even after repeated charging and discharging of a secondary battery and, thus, is suitable for use in battery modules for secondary batteries.

The heat-dissipating fluid composition may additionally include a second fluid that is miscible with the thermally conductive fluid. Here, the miscibility of the second fluid and the thermally conductive fluid can be confirmed by the fact that when these two fluids are mixed, 50% or more, or 80% to 100%, of the two fluids are not separated into individual layers after a certain period of time, for example, about five minutes, but are maintained as a single fluid layer.

As described above, the non-conductive oil of the present invention combines the hollow particles with the fluid while forming a separate phase from the fluid, and thus plays a role in maintaining excellent heat dissipation performance by inhibiting the settling of hollow particles. As the non-conductive oil, an oil with high electrical insulation, which reduces the risk of battery explosion due to the lack of electrical conductivity, or the like may be used. Therefore, the non-conductive oil may be a non-polar material having a relative permittivity of 5 or less.

Specifically, the non-conductive oil may be one or more selected from the group consisting of a mineral oil, a silicone oil, and a vegetable oil. The mineral oil may be an aliphatic mineral oil or an aromatic mineral oil. The silicone oil may be a silicone oil without a terminal hydroxyl group. The vegetable oil may be soybean oil, coconut oil, palm oil, cottonseed oil, camellia oil, or a hydrogenated oil.

Preferably, a silicone oil or a vegetable oil is used as the non-conductive oil. For example, the non-conductive oil may be a soybean oil that has excellent insulation properties and is capable of sustaining excellent heat dissipation performance.

In addition, as the thermally conductive fluid of the present invention, a thermally conductive fluid having a relative permittivity value of 40 or less, which does not cause electrical problems and at the same time exhibits an excellent thermal conductivity of 0.10 W/m·K or more and preferably 0.12 W/m·K to 0.3 W/m·K at 20° C., may be used.

Specifically, the relative permittivity of the thermally conductive fluid may be 15 or more, 10 or more, or 5 or more, and 45 or less, 40 or less, 35 or less, or 30 or less. A relative permittivity of the thermally conductive fluid exceeding 45 may not affect heat dissipation performance or properties, but in this case, when the composition is included in a battery module, electrical problems such as battery explosion may occur. In addition, when the relative permittivity of the thermally conductive fluid is excessively low, the fluid may not form a separate phase from the non-conductive oil, which is not desirable. Effective phase separation occurs when a difference in relative permittivity between the non-conductive oil and the thermally conductive fluid is, for example, 10 or more.

The relative permittivity can be measured as a ratio of the permittivity of a medium to the permittivity of a vacuum, under the conditions of a liquid volume of 42 ml and a temperature of 25° C. using a dielectric constant measuring instrument (Model 871, Sunraytech).

For example, the thermally conductive fluid may be ethanol, 2-propanol, or 2-methylpropanol (isobutanol). The relative permittivity of ethanol, 2-propanol, and 2-methylpropanol, measured using a dielectric constant measuring instrument under the above-described conditions, are 24.6, 18.3, and 17.3, respectively, which are suitable for use in the heat-dissipating fluid composition.

In addition, the thermally conductive fluid may have a lower density than the non-conductive oil. For example, the thermally conductive fluid may have a density of 0.6 to 0.85 g/mol at 25° C., and the non-conductive oil may have a density of 0.86 to 0.95 g/mol at 25° C. Accordingly, the thermally conductive fluid may be present in an upper layer portion of the heat-dissipating fluid composition, and the non-conductive oil may be present in a lower layer portion.

The thermally conductive fluid may be included in an amount of 5 to 200 parts by weight, 5 to 150 parts by weight, or 10 to 100 parts by weight based on 100 parts by weight of the non-conductive oil in the heat-dissipating fluid composition. When the content of the thermally conductive fluid is within the above ranges, heat dissipation performance may not be degraded, and the hollow particles may not settle.

The hollow particles according to an exemplary embodiment of the present invention may be included in an amount of 5 to 40 parts by weight or 5 to 30 parts by weight based on 100 parts by weight of the non-conductive oil in the heat-dissipating fluid composition. When the content of hollow particles is within the above ranges, heat dissipation performance may not be degraded, and the hollow particles may not settle.

In addition, as described above, the heat-dissipating fluid composition of the present invention may additionally include a second fluid that is miscible with the thermally conductive fluid. In the present specification, when it is stated that a second fluid is "miscible with a thermally conductive fluid," it means that the second fluid can be mixed with the thermally conductive fluid without being phase-separated from the same and, at the same time, is immiscible with the non-conductive oil.

Therefore, it is preferable that the second fluid has a relative permittivity of 40 or less or 15 to 40, and at the same time, that a difference in the Hansen solubility parameter between the second fluid and the thermally conductive fluid is 4.5 Mpa$^{1/2}$ or less and preferably 4 Mpa$^{1/2}$ or less. This is preferable because, in this case, electrical problems are not caused, and the settling of the hollow particles can be prevented because the second fluid is miscible with the thermally conductive fluid, and the second fluid may be immiscible with the non-conductive oil because a difference in relative permittivity between the second fluid and the non-conductive oil is 10 or more.

Here, the Hansen solubility parameter is a criterion for determining the miscibility between materials and is a value calculated in consideration of interactions between molecules, and can be represented by a total solubility parameter value (Hildebrand solubility parameter, δ) calculated according to Equation 1:

$$\delta=\sqrt{\delta_d^2+\delta_p^2+\delta_h^2}$$ [Equation 1]

In Equation 1, $\delta_d$ is a dispersion component dependent on a Van der Waals force, $\delta_p$ is the polar component related to a dipole moment, and $\delta_h$ is a hydrogen bonding component.

Therefore, it can be determined that mixing is easier as the difference in the Hansen solubility parameter calculated according to Equation 1 is smaller.

In addition, the second fluid is a thermally conductive fluid and may have a thermal conductivity of 0.10 W/m·K or more and preferably 0.12 to 0.3 W/m·K at 20° C. In the above ranges, the heat dissipation property of the heat-dissipating fluid composition can be improved to a greater extent.

As the second fluid, for example, acetonitrile, propane-1,2-diol, or 1-octanol may be used.

In addition, the sum of the hollow particles and the second fluid may be 10 to 100 parts by weight, 10 to 80 parts by weight, or 10 to 60 parts by weight based on 100 parts by weight of the non-conductive oil in the heat-dissipating fluid composition. In the heat-dissipating fluid composition, the second fluid may be included in an amount of 5 to 50 parts by weight based on 100 parts by weight of the non-conductive oil. When the content of the second fluid is within the above ranges, excellent heat dissipation performance can be maintained because the settling of hollow particles is inhibited due to the tendency of the second fluid to mix with the thermally conductive fluid.

Meanwhile, the above-described heat-dissipating fluid composition may have a dispersion stability of 90% or more as measured to determine the degree of settling of inorganic particles over time. Here, the dispersion stability is a value obtained by measuring the maximum height of a settled particle layer at 30 days after inputting a certain amount of the composition in a mass cylinder, and expressing the same as a percentage of the maximum height of a particle layer measured immediately after inputting the composition in a mass cylinder, and this value is preferably 95% or more, more preferably 99% or more, and most preferably 100% or more. Since the settling of inorganic particles is prevented in the heat-dissipating fluid composition having the above-described dispersion stability range for an extended period of time, excellent heat dissipation properties can be maintained even after a battery is repeatedly charged and discharged.

Battery Module

Yet another exemplary aspect of the present invention provides a battery module, which includes: a module case; a battery cell mounted in the module case; and a heat-dissipating fluid composition according to an exemplary embodiment of the present invention filled in the module case.

As illustrated in FIG. 2, the battery module according to the present invention includes, inside the module case, a battery cell and an external plate for electrically connecting the battery cell and an external device (not shown) and has a structure (not shown) in which the heat-dissipating fluid composition of the present invention is filled, as necessary, to a predetermined height not exceeding 90% of the inner height of the module case interior. In addition, temperature lines may be attached to some parts of the module case and the battery so that the temperature inside the module can be measured during charging and discharging to evaluate the heat dissipation properties of the heat-dissipating fluid composition.

In this case, as the module case, aluminum, a plastic, stainless steel, or a combination of two or more thereof may be used. For example, polyethylene terephthalate (PET), which has excellent heat dissipation performance, or aluminum, which has excellent durability and is easy to transport, may be used. In addition, the heat-dissipating fluid composition may be filled to a height of 90% or less, or 30 to 80%, of a total height inside the module case.

The battery cell may have a maximum voltage of less than 65 V, or 20 V to 55 V. When the above ranges are satisfied, electrical problems due to high voltage may not occur.

Battery Pack

Yet another exemplary aspect of the present invention provides a battery pack, which includes: two or more battery modules according to an exemplary embodiment of the present invention; and a pack case for accommodating the battery modules. The battery pack of the present invention has excellent internal electrical insulation and quickly dissipates the heat that may cause a battery to explode, and in particular, excellent heat dissipation properties can be maintained because the hollow particles of the heat-dissipating fluid composition contained in the battery module do not settle even with repeated charging and discharging.

The battery pack may include 2 to 30 or 5 to 20 battery modules. When the above ranges are satisfied, excellent electrical properties and excellent heat generation performance can be exhibited.

Hereinafter, exemplary embodiments of the present invention will be described in detail so that those skilled in the art can easily implement the present invention. However, the present invention may be implemented in several different forms and is not limited to the embodiments described herein.

EXAMPLES AND COMPARATIVE EXAMPLES

Example 1

(1) Preparation of Hollow Particles I

After treating 100 g of styrene spherical particles, having an average particle diameter ($D_{50}$) of 1 μm, with 500 g of sulfuric acid to modify the particle surface with anions, 25 g of carbon nanotubes (LG Chem) were added to the styrene spherical particles.

The carbon-treated styrene spherical particles were immersed in 100 ml of an ATSB solution to introduce alumina precursor cations ($Al^{3+}$) into the carbon-treated styrene spherical particles.

The styrene spherical particles treated with carbon and into which the alumina precursor cations had been introduced were thermally treated at 800° C. for one hour under oxygen conditions to form an inorganic particle layer including alumina and carbon nanotubes at a weight ratio of 4:1 on the surface of the particles, and, at the same time, hollow inorganic particles having an inorganic particle layer surrounding an empty inner space were obtained.

The hollow inorganic particles were immersed in a tie resin solution (20% (w/w) cyano resin solution (solvent: acetonitrile), Shinetsu), dried at 100° C., immersed in a coating resin solution (20% (w/w) styrene-butadiene rubber solution (solvent: tetrahydrofuran (THF))), and then dried at 90° C. Thereby, hollow particles I, which include a polymer coating layer with a thickness of 0.3 μm and have an average particle diameter ($D_{50}$) of 1 μm and a hollow diameter of 0.3 μm, were obtained.

(2) Preparation of Heat Dissipating Fluid Composition 100 parts by weight of soybean oil (Beksul Soybean Oil, CJ Cheiljedang Corp.) as a non-conductive oil and 50 parts by weight of ethanol as a thermally conductive fluid were added to a 1 L cylinder-type reactor at room temperature, and after about five minutes, it was confirmed that the soybean oil and the ethanol were separated into different phases and individual layers were formed. 30 parts by weight of the hollow particles I and 30 parts by weight of acetonitrile (Hansen solubility parameter: 24.4 $MPa^{1/2}$) as a second fluid were added to another 1 L cylinder-type reactor containing 1 kg of zirconia balls having a diameter of 1 mm, and were stirred at 200 rpm for two hours with a ball mill. After stirring, a second mixture was obtained through filtering, which was then mixed with the first mixture to obtain a heat-dissipating fluid composition. The obtained heat-dissipating fluid composition was separated into different phases, and an upper layer portion containing ethanol (density: 0.789 g/ml, Hansen solubility parameter: 26.5 $MPa^{1/2}$) and a lower layer portion containing soybean oil (density: 0.917 g/ml) were formed.

Example 2

Hollow particles II and a heat-dissipating fluid composition were prepared in the same manner as in Example 1 except that a tetrachlorosilane solution was used instead of the ATSB solution, and graphene was used instead of carbon nanotubes.

Example 3

Hollow particles III and a heat-dissipating fluid composition were prepared in the same manner as in Example 1 except that, unlike in Example 1 where the hollow particles were prepared while forming an inorganic particle layer including alumina and carbon nanotubes at a weight ratio of 4:1 on the surface of the particles, hollow inorganic particles were prepared while forming an inorganic particle layer including alumina and carbon nanotubes at a weight ratio of 3:1 on the surface of the particles.

Example 4

Hollow particles IV and a heat-dissipating fluid composition were prepared in the same manner as in Example 1 except that hollow particles were prepared using a poly (methyl methacrylate) solution as a coating resin solution instead of the styrene-butadiene rubber solution.

Example 5

Hollow particles V and a heat-dissipating fluid composition were prepared in the same manner as in Example 1 except that hollow particles were prepared using a 30% (w/w) poly(ethylene-co-vinyl acetate) solution (solvent: THF) as a tie resin solution instead of the 20% (w/w) cyano resin solution, and the thickness of a polymer coating layer was adjusted to 0.4 μm instead of 0.3 μm.

Example 6

Hollow particles VI and a heat-dissipating fluid composition were prepared in the same manner as in Example 1 except that styrene particles having an average particle diameter ($D_{50}$) of 2 μm were used instead of the styrene particles having an average particle diameter ($D_{50}$) of 1 μm when preparing hollow particles, and thus the average particle diameter ($D_{50}$) of the hollow particles was 1.5 μm.

Comparative Example 1

FR3 (Cargill, Inc.) containing a vegetable oil (V-oil) as a main ingredient was used as a heat-dissipating fluid composition, and hollow particles, a thermally conductive fluid, and a second fluid were not used.

Comparative Example 2

A heat-dissipating fluid composition was prepared in the same manner as in Example 1 except that hollow silica particles having an average particle diameter ($D_{50}$) of 1 μm and a hollow diameter of 0.4 μm were used as hollow particles instead of the hollow particles I.

Comparative Example 3

A heat-dissipating fluid composition was prepared in the same manner as in Example 1 except that single-walled carbon nanotubes (791490, Sigma-Aldrich) were used instead of the hollow particles I.

Comparative Example 4

A heat-dissipating fluid composition was prepared in the same manner as in Example 1 except that hollow inorganic particles having an average particle diameter ($D_{50}$) of 1 μm, a hollow diameter of 0.3 μm, and not including a polymer coating layer were used as hollow particles.

Comparative Example 5

After treating 100 g of styrene spherical particles having an average particle diameter ($D_{50}$) of 1 μm with 500 g of sulfuric acid, thereby modifying the particle surface with anions, the particles were immersed in 100 ml of an ATSB solution to introduce alumina precursor cations ($Al^{3+}$) to the styrene spherical particles.

The styrene spherical particles, into which the alumina precursor cations had been introduced, were thermally treated at 800° C. for one hour under oxygen conditions to form an inorganic particle layer including alumina on the surface of the particles, and, at the same time, inorganic particles in which the inorganic particle layer surrounds an empty inner space were obtained.

The hollow inorganic particles were immersed in a tie resin solution (20% (w/w) cyano resin solution (solvent: acetonitrile), Shinetsu), dried at 100° C., immersed in a coating resin solution (20% (w/w) styrene-butadiene rubber solution (solvent: THF)), and then dried at 90° C. to obtain hollow particles VII, which include a polymer coating layer with a thickness of 0.3 μm and have an average particle diameter ($D_{50}$) of 1 μm and a hollow diameter of 0.3 μm.

A heat-dissipating fluid composition was prepared in the same manner as in Example 1 except that hollow particles VII were used as the hollow.

Comparative Example 6

25 g of carbon nanotubes (LG Chem) were added to 100 g of styrene spherical particles having an average particle diameter ($D_{50}$) of 1 μm.

The carbon-treated styrene spherical particles were thermally treated at 800° C. for one hour under oxygen conditions to form a carbon nanotube layer on the surface of the particles and obtain particles in which an empty inner space is formed inside the carbon nanotube layer.

The particles were immersed in a tie resin solution (20% (w/w) cyano resin solution (solvent: acetonitrile), Shinetsu), and without being subjected to a drying process, the particles were subsequently immersed in a coating resin solution (20% (w/w) styrene-butadiene rubber solution (solvent: THF)) and then dried at 90° C. to obtain hollow particles VIII, which include a polymer coating layer with a thickness of 0.3 μm and have an average particle diameter ($D_{50}$) of 1 μm and a hollow diameter of 0.3 μm.

A heat-dissipating fluid composition was prepared in the same manner as in Example 1 except that hollow particles VIII were used as the hollow particles.

EXPERIMENTAL EXAMPLES

The heat dissipation performance and dispersion stability of the heat-dissipating fluid compositions prepared in Examples 1 to 6 and Comparative Examples 1 to 6 were measured by the following methods, and the results are shown in Table 1.

Measurement of Heat Dissipation Performance

After attaching temperature lines to a battery module case and the inside of a battery cell as illustrated in FIG. 2, the prepared heat-dissipating fluid composition was filled to 80% of the inner height of the module case. Subsequently, while recording the internal temperature of the battery module, the battery cell was charged at constant current for 0.5 hours at 25° C. until the voltage reached 50 V, and after a two-hour resting period, the battery cell was discharged at constant current for 0.5 hours until the voltage reached 50 V. The maximum measured internal temperature (° C.) of the battery module is shown in Table 1.

In addition, after filling the prepared heat-dissipating fluid composition to 30% of the inner height of the module case, a battery cell was charged and discharged in the same manner, and the maximum internal temperature (° C.) of the battery module is also shown in Table 1.

Temperature changes inside battery cells during the charging and discharging of battery modules are schematically illustrated in FIG. 3. As illustrated in FIG. 3: the battery cells were heated during charging and reached a maximum charging temperature; subsequently, the batter cells were cooled during the resting period in which charging or discharging did not occur; and the battery cells were again heated during discharging and reached a maximum discharge temperature after a certain period of time. By measuring maximum temperatures inside battery cells, such as the maximum charging temperature and the maximum discharge temperature, it is possible to determine whether the heat-dissipating fluid composition quickly dissipates heat generated in the battery cells during charging and discharging. The lower the maximum temperature inside a battery module, the more battery cells can be mounted in the module, and accordingly, the higher the possibility of improving battery capacity. Therefore, in this Experimental Example, heat dissipation characteristics were evaluated by measuring the maximum discharge temperature.

Evaluation of Dispersion Stability (%)

150 g of the prepared heat-dissipating fluid composition was added to a mass cylinder, and the maximum height of the particle layer is a 100, but. After 30 days, the maximum height of a settled particle layer was measured, and the measured value is expressed as a percentage of the initial maximum height.

TABLE 1

| | Non-conductive oil (parts by weight) | Thermally conductive fluid (parts by weight) | 2nd fluid (parts by weight) | Hollow particles (parts by weight) | Maximum temperature of battery module 80% filled with composition (° C.) | Maximum temperature of battery module 30% filled with composition (° C.) | Dispersion stability (%) | Misc. |
|---|---|---|---|---|---|---|---|---|
| Example 1 | Soybean oil (100) | Ethanol (50) | Acetonitrile (30) | Hollow particles I (30) | 45 | 47 | 100 | — |
| Example 2 | Soybean oil (100) | Ethanol (50) | Acetonitrile (30) | Hollow particles II (30) | 44.5 | 46 | 100 | — |
| Example 3 | Soybean oil (100) | Ethanol (50) | Acetonitrile (30) | Hollow particles III (30) | 43 | 46 | 100 | — |

TABLE 1-continued

| | Non-conductive oil (parts by weight) | Thermally conductive fluid (parts by weight) | 2nd fluid (parts by weight) | Hollow particles (parts by weight) | Maximum temperature of battery module 80% filled with composition (° C.) | Maximum temperature of battery module 30% filled with composition (° C.) | Dispersion stability (%) | Misc. |
|---|---|---|---|---|---|---|---|---|
| Example 4 | Soybean oil (100) | Ethanol (50) | Acetonitrile (30) | Hollow particles IV (30) | 45 | 47 | 95 | — |
| Example 5 | Soybean oil (100) | Ethanol (50) | Acetonitrile (30) | Hollow particles V (30) | 43 | 45.5 | 100 | — |
| Example 6 | Soybean oil (100) | Ethanol (50) | Acetonitrile (30) | Hollow particles VI (30) | 45 | 47 | 100 | — |
| Comp. Example 1 | V-oil (100) | — | — | — | 57 | 60 | — | — |
| Comp. Example 2 | Soybean oil (100) | Ethanol (50) | Acetonitrile (30) | Hollow silica particles (30) | 47 | 49 | 90 | — |
| Comp. Example 3 | Soybean oil (100) | Ethanol (50) | Acetonitrile (30) | Single-walled carbon nanotubes (30) | Measurement not possible due to electrical short circuit | Measurement not possible due to electrical short circuit | 70 | Electrical short circuit phenomenon occurs |
| Comp. Example 4 | Soybean oil (100) | Ethanol (50) | Acetonitrile (30) | Hollow inorganic particles without polymer coating layer (30) | Measurement not possible due to electrical short circuit | Measurement not possible due to electrical short circuit | 70 | Electrical short circuit phenomenon occurs |
| Comp. Example 5 | Soybean oil (100) | Ethanol (50) | Acetonitrile (30) | Hollow particles VII (30) | 49 | 51 | 95 | — |
| Comp. Example 6 | Soybean oil (100) | Ethanol (50) | Acetonitrile (30) | Hollow particles VIII (30) | Measurement not possible due to electrical short circuit | Measurement not possible due to electrical short circuit | 50 | Electrical short circuit phenomenon occurs |

As shown in Table 1, the battery modules of the Examples in which the heat-dissipating fluid composition of the present invention was used had significantly improved heat dissipation properties as compared to the battery module of Comparative Example 1 in which a conventional heat-dissipating fluid was used.

Meanwhile, for the battery module of Comparative Example 2, degraded heat dissipation properties and low dispersion stability were achieved compared to the battery modules of the Examples in which the heat-dissipating fluid composition of the present invention was used, because hollow silica particles which did not include conductive carbon-based particles in an inorganic particle layer and had no polymer coating layer for surrounding the inorganic particle layer were used as hollow particles in Comparative Example 2. In addition, for the battery modules of Comparative Examples 3 and 4, significantly degraded heat dissipation properties and significantly low dispersion stability were achieved compared to the battery modules of the Examples in which the heat-dissipating fluid composition of the present invention was used, as confirmed by the occurrence of an electrical short circuit, because only single-walled carbon nanotubes were used as hollow particles in Comparative Example 3 and hollow inorganic particles not including a polymer coating layer for surrounding an inorganic particle layer were used in Comparative Example 4. For the battery module of Comparative Example 5, heat dissipation deteriorated, because carbon nanotubes having high thermal conductivity were not used. For the battery module of Comparative Example 6, high electrical conductivity was achieved, thereby causing an electrical short circuit, because carbon nanotubes were not added to ceramic particles.

Therefore, it can be seen that, according to the present invention, both heat dissipation performance and dispersion stability can be improved, because hollow spherical particles, which include an inorganic particle layer including ceramic particles and conductive carbon-based particles and a polymer coating layer surrounding the inorganic particle layer and in which the inorganic particle layer surrounds an empty inner space, are included in a heat-dissipating fluid composition.

The invention claimed is:

1. Hollow spherical particles, comprising:
   an inorganic particle layer including ceramic particles and conductive carbon-based particles; and
   a polymer coating layer surrounding the inorganic particle layer,
   wherein the inorganic particle layer surrounds an empty inner space to form the hollow spherical particles.

2. The hollow spherical particles of claim 1, wherein the ceramic particles include one or more selected from the group consisting of silica, alumina, and aluminosilicate.

3. The hollow spherical particles of claim 1, wherein the conductive carbon-based particles include one or more selected from the group consisting of graphite, graphene, and carbon nanotubes.

4. The hollow spherical particles of claim 1, wherein a weight ratio of the ceramic particles and the conductive carbon-based particles is from 5:1 to 3:1.

5. The hollow spherical particles of claim 1, wherein the polymer coating layer includes a polymer having a relative permittivity of 45 or less.

6. The hollow spherical particles of claim 1, wherein the polymer coating layer has a thickness of 0.3 μm to 2 μm.

7. The hollow spherical particles of claim 1, having an average particle diameter ($D_{50}$) of 0.5 μm to 5 μm and a hollow diameter of 0.1 μm to 2 μm.

8. A method of manufacturing the hollow spherical particles of claim 1, the method comprising:
(A) treating spherical particles formed of a thermoplastic polymer with an acid to form acid-treated spherical particles, and adding conductive carbon-based particles to the acid-treated spherical particles to form carbon-treated spherical particles;
(B) immersing the carbon-treated spherical particles in a ceramic precursor solution to introduce ceramic precursor ions to the carbon-treated spherical particles and to form spherical particles including ceramic particles and conductive carbon-based particles;
(C) thermally treating the spherical particles including ceramic particles and conductive carbon-based particles to form the hollow spherical particles comprising the inorganic particle layer including the ceramic particles and the conductive carbon-based particles, and wherein the inorganic particle layer surrounds the empty inner space to form the hollow spherical particles; and
(D) immersing the hollow spherical particles in a hydrophilic resin solution to form a polymer coating layer on an outer surface of the inorganic particle layer of the hollow spherical particles.

9. The method of claim 8, wherein the thermoplastic polymer is one or more selected from the group consisting of styrene, poly(styrene-co-divinylbenzene), and polyphenylene ether.

10. The method of claim 8, wherein the thermal treatment of step (C) is carried out at a temperature of 500° C. to 1,000° C.

11. The method of claim 8, wherein the thermal treatment of step (C) is carried out under oxygen conditions.

12. The method of claim 8, wherein step (D) additionally includes immersing the hollow spherical particles in a tie resin solution before immersing the hollow spherical particles in the hydrophilic resin solution.

13. The method of claim 12, wherein the tie resin is one or more selected from the group consisting of an ethylene-vinyl acetate resin, an ethylene-methyl acrylate resin, an ethylene-acrylic acid resin, and a cyano resin.

14. A heat-dissipating fluid composition comprising:
a non-conductive oil;
a thermally conductive fluid; and
the hollow particles of claim 1.

15. The heat-dissipating fluid composition of claim 14, comprising, based on 100 parts by weight of the non-conductive oil:
5 to 200 parts by weight of the thermally conductive fluid; and
5 to 40 parts by weight of the hollow spherical particles.

* * * * *